United States Patent

Catalano et al.

[15] 3,669,374

[45] June 13, 1972

[54] COMBINED ENDLESS LOOP FILM AND ENDLESS LOOP MAGNETIC TAPE CARTRIDGE

[72] Inventors: Paul Catalano, Manhasset; John Bickel, Ossining, both of N.Y.

[73] Assignee: Retention Communication Systems, Inc., New York, N.Y.

[22] Filed: April 23, 1969

[21] Appl. No.: 818,683

[52] U.S. Cl. ..........................242/55.19 A, 242/194, 352/31, 352/72, 352/128

[51] Int. Cl. ................B65h 17/48, G03b 23/02, G03b 21/00

[58] Field of Search.........................242/55.19 A, 55.19, 194; 352/78, 76, 72, 26, 128, 126, 31

[56] References Cited

UNITED STATES PATENTS

| | | | |
|---|---|---|---|
| 2,681,591 | 6/1954 | Nyman | 352/31 |
| 2,853,923 | 9/1958 | Daniel | 352/31 |
| 2,930,285 | 3/1960 | Platt | 353/15 |
| 2,975,990 | 3/1961 | Rodriguez | 242/194 |
| 3,211,054 | 10/1965 | Schwartz et al | 353/15 |
| 3,244,471 | 4/1966 | Mead | 352/72 |
| 3,252,372 | 5/1966 | Gallina | 353/15 |
| 3,414,351 | 12/1968 | Platt | 352/72 X |

*Primary Examiner*—Billy S. Taylor
*Attorney*—Flynn & Frishauf

[57] ABSTRACT

A pair of reels holding endless loops of film, and magnetic recording tape, respectively, are nested wholly, or partly with one reel located within an unobstructed space beneath the rim of the other; when partly nested (FIGS. 2–4) the film reel rotates about an axis inclined with respect to the axis of tape reel, so that the film reel dips (through an opening in a central support) into the unobstructed space within the tape reel to enable the lower edge of film to clear the diametrically opposed upper edge of the reel. When wholly nested (FIGS. 1*a* and 1*b*), one reel (either film or tape) is nested completely within the other with co-planar axes of rotation, the film and tape being taken off and guided to projection and reproduction positions, respectively.

10 Claims, 6 Drawing Figures

Inventors
Paul Catalano
John Bickel
By
Flynn & Frishauf
Attorneys

Inventors
Paul Catalano
John Bickel
By Flynn & Frishauf
Attorneys

COMBINED ENDLESS LOOP FILM AND ENDLESS LOOP MAGNETIC TAPE CARTRIDGE

The present invention relates to combined film and magnetic tape cartridges, and more particularly to such structures for use in audio-visual equipment in which still pictures, or motion pictures, are to be projected while, at the same time, magnetic tape is reeled off an endless tape to audibly reproduce explanations relating to the projected picture sequence.

Endless bands of magnetic tape, spooled on reels and used for plain recorded material over and over again are known; it is comparatively simple to guide such magnetic tape over appropriate guiding arrangements in a cartridge, or cassette, since the magnetic tape is highly flexible and limp, and direction of the tape can readily be changed. If such tape is, however, to be associated with film and particularly with an endless loop of film, difficulty arises in properly packaging both the tape and the film to provide for simultaneous visual projection and audible reproduction of explanatory matter in a small space. The film is not as flexible as the magnetic tape and special precautions must be taken to prevent damage thereto during frequent reeling. The film itself may be maintained in a cartridge-type holder, constrained by surrounding walls and placed therein in random loose fashion; or wound over regularly arranged rollers, to form an endless loop; or wound on two reels; or spooled on a single reel to be paid out from an inner point at the rim of the reel, and then taken up at the outer circumference. When used with motion picture film, and particularly when intended to be used in small cartridges where space is at a premium, difficulties have arisen in properly unwinding, guiding, and re-winding endless loops of film due to the stiffness of the film and its inability to flex over pivot points of small diameter, while keeping the cartridge thin and small.

It is an object of the present invention to provide a tape and endless film cartridge which is thin, small, compact, and capable to be used with film only 88 mm wide, without placing damage and twisting stresses on the film.

SUBJECT MATTER OF THE PRESENT INVENTION:

Briefly, the cartridge of the present invention is constructed to hold a film reel and a tape reel in nested arrangement, one reel being located wholly or partly within an unobstructed space beneath the rim of the other. In one form of the invention, the tape reel is so constructed that an unobstructed space is left therebeneath, the film reel being supported with its axis tilted with respect to the axis of rotation of the tape reel so that the film reel dips into the unobstructed space of the tape reel; film spooled on the film reel can then be removed in a plane essentially parallel to that of the tape reel, the lower edge of the film being removed from, or spooled on the film reel then clearing the upper edge of the film reel in the region where it is dipped into the spaced formed beneath the rim of the tilt reel.

In a preferred form of this embodiment, the film side and the tape side of the cartridge are separated from each other by a central support plate which has an opening in the region where the film reel dips into the space of the tape reel; such a cartridge is versatile, since the same construction can be used with film of widely different lengths by interchanging film reels or, if short length of films are to be used, leaving the film loose at the film side and removing the film reel entirely, so that the film will be located in the cartridge at random as in a stuffing box.

In another form of the present invention, the film and tape reel are nested within each other completely, the film and tape being guided off the respective reels in a suitable manner. This form of the present invention is particularly suitable for larger diameter reels, or with particularly flexible film capable of being bent over inclined film guides. Film and tape may thus appear at a projection and recording position of the cartridge parallel, and next to each other, and the entire cartridge can be constructed to have a width only slightly greater than that of the combined width of the tape and the film.

The present invention is particularly applicable to strip and motion picture film projection using "Super 8" motion picture film, as individually projected pictures, with sound, or as motion pictures with separately recorded sound, thus providing a very compact and small cartridge. The tape itself may be of the ⅛ inch, 0.15 inch, or ¼ inch width type, accommodating two or more tracks; if four tracks are available, two tracks may be used alternately, the tape running through two spooling-respooling length upon projection of one complete set of pictures from the film. One track on the tape may be used as a control track, to control advance of film, and, if desired, to exercise other control functions, while another track may be used as a sound track; alternately, inaudible control signals can be recorded together with audio signals on one single track. In a commercial form, the cartridge will be formed with an upper plate at the film side and further will include resilient elements adapted to engage the tape, against which a tape transport mechanism and tape recording-reproducing heads, and the like (such as erasing heads) may bear. The film, and the tape, while being guided within the cartridge, may also be contacted by pressure pads applying lubricant or cleaning substances through the film, or tape, respectively.

The invention will be described by way of example with reference to the accompanying drawings, wherein:

FIG. 1*a* is a transverse cross-sectional view through a portion of a cartridge showing nested tape and film reels, shown separated and exploded as indicated by the brackets;

FIG. 1*b* is a schematic top view of the cartridge of FIG. 1*a*, in which all unessential parts not necessary for an understanding of the present invention have been omitted;

Figures 1A, 1B, 2, 3, 4:
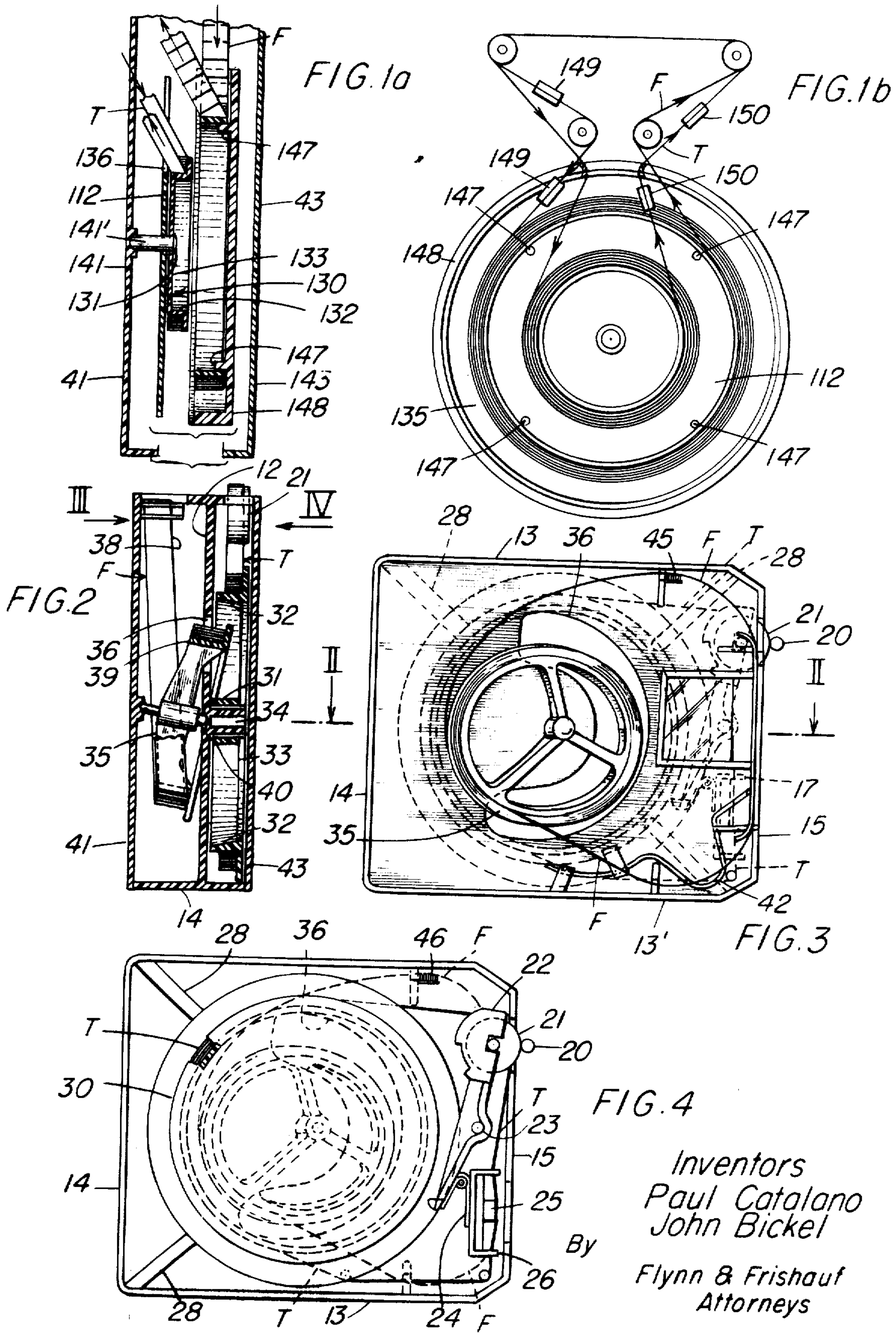
FIG. 2 is a transverse cross-sectional view along line II—II of FIG. 3, illustrating a cartridge using an inclined film reel dipping into unobstructed space within the tape reel.
FIG. 3 is a top plan view of the embodiment of FIG. 2, seen from the film side in the direction of arrow III—III.
Figure 5:
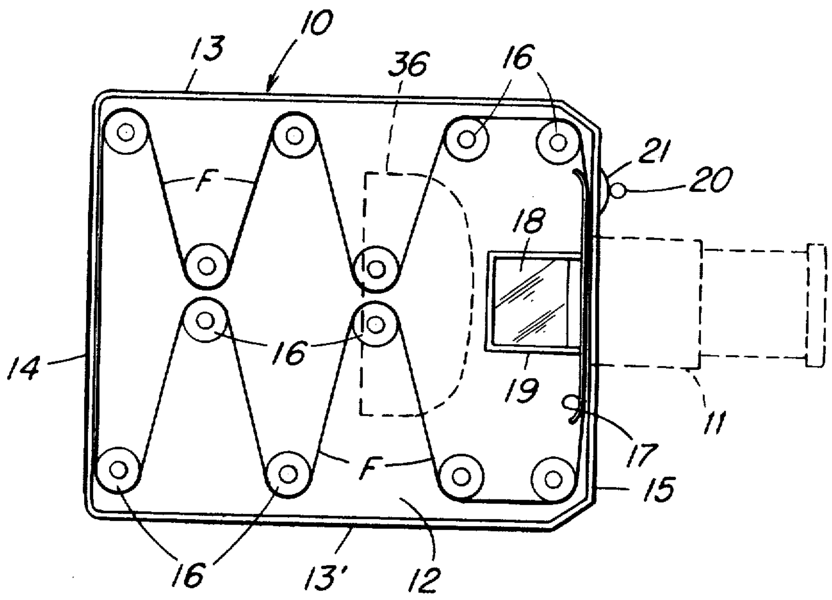

FIG. 4 is a bottom plan view of the cartridge of FIG. 2 seen from the tape side, looking in the direction of arrow IV of FIG. 2 with the film gate spring and associated mechanism omitted; and FIG. 5 is a schematic top plan view of the film side of the combined cartridge for tape and film, the tape side being obstructed by an opaque common support plate, and used as a stuffing box, with the film reel removed.

The tape cartridge of the present invention is intended for use with a projector having its own film transport mechanism (for single frame strip film projection, or for motion picture projection, as desired) tape transport mechanism, light generating arrangement to project light through the film, and electronics including magnetic transducer heads for recording, reproducing and erasing of audio and control signals, all as well known in the art. None of the elements, not forming part of the present invention, are here illustrated.

The general arrangement of the cartridge is best seen by first referring to FIG. 5. A light source projects a beam of light into the plane of the drawing, to be there deflected by a mirror 18 and projected through an optical arrangement schematically illustrated in dashed lines at 11. The cartridge 10 has a common center support plate 12, on one side of which a film F, intended, for example for single-frame projection, is located. This film may be placed loosely in the space defined by the common plate 12 and a pair of side walls 13, 13', a back wall 14 and a front wall 15. A top dust cover, which is preferably transparent, can be placed on top of the walls to close off the film side of the cartridge.

The film need not, however, be loose in the space so defined, but may be spooled over a plurality of idler rollers 16, located in a suitable fashion, so as to extend the length of the endless belt of film F and retain it in position. Idlers 16 are preferably of suitable diameter to prevent damage to the film by bending over a sharp radius.

The front wall 15, preferably chamfered or rounded at the edges where it merges with the side walls 13, 13', is formed with suitable cut-outs to provide for projection of light therethrough; additionally, suitable openings are provided for engagement of the film by a film transport mechanism, such as an oscillating claw, a maltese cross, or the like, none of which are shown since they are well known in the art. A pressure plate 17 resiliently guides the film against the front wall 15; the attachment of the pressure plate 17 is likewise not shown for clarity and well known in the art. Immediately behind the pressure plate, mirror 18 directs light through the aperture of front wall 15, which may itself be formed as an aperture plate. Mirror 18 is secured in a cage 19 to the common support plate 12.

The other side of the film cartridge, not seen in FIG. 1, retains a tape reel, on which an endless loop of tape is wound, the tape slipping against itself during turning of the tape reel. The tape itself is transported by a tape transport mechanism indicated by a drive capstan 20, bearing against a pressure roller 21 retained in cartridge 10. Tape would pass over roller 21, to be driven by capstan 20 (FIG. 4). Roller 21, itself, is retained in a roller holder 22, pivoted at a pivot point 23, and resiliently pressed outwardly by a spring 24. Spring 24 also presses a pressure pad 25, within a holder 26 resiliently outwardly towards front wall 15. A magnetic transducer assembly of the recording-reproduce mechanism would be located opposite pressure pad 25 to record, reproduce, or erase signals on the magnetic tape indicated generally by T. Such transducer assemblies, and the associated electronic circuitry, would normally form part of the apparatus with which the cartridge is to be associated.

The side, back and front walls extend substantially perpendicularly to the plate 12, at both the film side, as well as the tape side. The tape side may, similarly to the film side, also be closed off by a dust cover. The central support plate 12 is preferably provided with stiffening ribs 28, to provide rigidity for the entire assembly. The ribs may extend on both the tape as well as the film side, or be located only on one, as desired, and be shaped and arranged in accordance with available space in view of the tape and film to be located within the cartridge.

The tape is spooled on a tape reel 30 (FIG. 4) which has a central hub 31, a rim 32, and a connecting disk 33, interconnecting the rim and the hub. The tape itself is spooled over the rim 32. The reel 30 is journalled on a stub shaft 34 secured to the support plate 12. The support plate 12, itself, together with the side walls and the stub shaft, and with its reinforcing ribs, is preferably a single integrated plastic molding. By forming tape reel 30 in the manner indicated, that is by interconnecting the rim by means of a disc with the central hub, a free space is provided within the tape reel, and beneath the disc 33. Alternatively, disc 33 may be formed of spokes which, however, are not located centrally, with respect to the width of tape T, of the tape reel 30, but are rather located at the far end, similar to disc 33.

Only a limited length of film can be accommodated in the cartridge if the film is placed therein at random and loose. The invention provides a cartridge which is thin and small in which an endless loop of film is spooled on a film reel 35 (FIGS. 2 and 3), so that a greater length of an endless loop of film can be accommodated.

When spooling off an endless ribbon from a reel, the ribbon is taken off an inner winding and supplied to the outermost layer. In accordance with the invention, the film reel and the tape reel are nested within each other to make the resulting cartridge compact. In order to clear the edge of the reel, the ribbon must be lifted thereover. This is simple if the ribbon is pliable and can readily be twisted or guided in a path permitting removal of this type. It is difficult, however, to twist some types of motion picture film in this manner due to its greater stiffness. In accordance with a feature of the present invention (see FIGS. 2 and 3), the film reel 35 is so located in the cartridge that it only partly enters into the free space provided by the tape reel 30 between the rim 32 and the reel hub 31; this is achieved by placing the axis of the film reel 35 at an angle, as clearly seen in FIG. 2. This is readily possible by interconnecting rim 32 and hub 31 of reel 30 only at one side. The central support plate 12 is formed with a sector-shaped cut-out 36 (FIG. 3) to permit the rim of the film reel to pass through the center support plate and enter the space beneath the tape reel 30. The film F can then be removed from film reel 35 in a direction essentially parallel to the central support plate 12, although it may be pulled off at a slight angle, as indicated in FIG. 2; the angle of inclination of the axis of rotation of film reel 35 must be so selected that the lower edge 38 of film F clears the upper edge 39 of the film reel 35 at the point where the film reel dips into the space beneath the tape reel 30, that is, approximately diametrically to the point where the film is taken off from reel 35.

Film reel 35 is preferably retained in the support plate 12 in a self-adjusting bearing, such as a substantially spherical or conical cup 40, into which a rounded stub fits. The upper end of reel 35 is similarly rotatably secured in a dust cover 41 located at the film side. As an alternative, an inclined stub shaft can be molded on the plate 12, thus eliminating the requirement for any further attachment, and thus mechanical strength of the dust cover 41.

The film spooled off reel 35 is again guided between front wall 15 and pressure plate 17; the pressure plate is held against the film by a spring 42, secured to the support plate 12 by suitable plastic projections and grooves only schematically indicated. The cartridge may include pads 45, 46, bearing against the film and tape respectively, impregnated with film cleaner, tape cleaner, lubricants or the like.

The cartridge of the present invention can be made flat and compact, since the thickness required essentially is only that of the thickness necessary to provide sufficient mechanical strength for the central support plate 12, the width of the tape T (which may be, for example, 0.15 inch) and the width of the film (which may be, for example, only 8 mm). The entire thickness of the cartridge, therefore, can be less than three-fourths inch, while still providing a strong mechanical structure. In the embodiment illustrated in FIGS. 2 to 4, the central support plate 12 need not be a solid plate, formed with the cut-out 36, but may be any suitable structural arrangement, such as a spider or other support to separate the film and the tape sides of the cartridge, and hold and guide the tape reel 30 while holding and guiding the film reel 35, with an axis of rotation inclined with respect to that of the tape reel 30 so that the film reel 35 will dip into the space between the rims 32 of the tape reel. If desired, the dust cover on the tape side may also be formed with a bearing to additionally rotatably hold the tape reel 30 in position.

The structure described so far in connection with FIGS. 2 to 4, provided a tape and film cartridge in which the film was partly nested within the tape and located at an angle to provide for spooling off without imparting a twist to the tape. If cartridges having large diameter reels can be accommodated in the projection and reproducing equipment for which the cassette or cartridge is to be designed, tape and reel cartridges may be completely nested within each other with co-planar axes. Referring to FIGS. 1*a* and 1*b*, a support plate 112 extends transversely in the housing, in which a cut-out 136 is formed to permit passage of the ribbon wound on a reel supported from the plate 112. This reel, which may accommodate either the film, or the tape, and in this form of the invention preferably the tape, again has the ribbon of material spooled on it in an endless loop; the end of the ribbon being paid out, and supplied to the reel being indicated by the respective arrows. The reel 130 holding the tape is journaled on plate 112 at a central hub 131, connected to a housing plate 141 by means of a stand-off 141'. The reel itself has a rim 132 on which the tape T is spooled. The rim 132 is connected to the hub 131 by means of a connecting web, which may be in shape of a spider or other support 133. Tape reel 130 is completely nested within the film wound in a roll or coil 135. Film roll 135 is formed merely in the shape of a thin ring, without any central hub or web, and rotatably held in position within the other side 143 of the housing by inwardly extending projections 147, 148, which may be ring-shaped, or project inwardly as a series of circularly located stubs, to form a bearing surface about which the ring holding roll 135 can rotate. In one form of the invention, the end portion of the housing is reinforced to provide an overlapping ring reaching around the roll 135 for part of its circumference, to keep the film F in position, the partly confining cage being illustrated at 148. Of course, cage 148 must be opened at the region where the film F is removed and again re-supplied to the reel formed by the rim 135.

The tape reel 130 need not be located entirely within the film roll, but may be actually moved, in FIG. 1*a*, for example to the left, with respect to the film roll 135; this arrangement provides a compact cartridge particularly when the magnetic tape is comparatively wide, for example having a width in the order of, or even greater than that of the film F.

In order to guide the tape, and the film, in their respective paths, film and tape guide means are provided in the cartridge, shown schematically in FIG. 1*b* at 149, 150; these may be smooth, plastic moldings, around which the film may bear and be guided, changing direction and attitude to enable placing film, and tape, beneath each other (with respect to FIG. 1*b*; that is, side-by-side with respect to FIG. 1*a*). The arrangement, shape and location of such film guides will be obvious, and is a matter of design, depending on the specific location of film take-up and pay-out points, as well as on the diameter of the tape reel and film reel, respectively; and will depend further to some extent on the flexibility and pliability, therefore on the material of the film, and tape, for which the cartridge is to be designed.

The construction of the reels without the hub can also be used in connection with the cassette illustrated in FIGS. 2 to 4. The tape reel can be formed as a ring-shaped plastic molding, rotatable about a ring-shaped projection extending from the central support structure; such an arrangement, if suitably lubricated and made of readily slidable low-friction material, provides maximum space for the tilting of the film reel at one side within the spaced formed by the width of the tape itself. The film reel, likewise, need not have a central hub, and may be formed as a rotatable ring, rotating about a guide surface or guide pins and having an axis of rotation inclined with respect to the direction of the central support structure and the axis of rotation of the reel for the tape.

Dust cover 41 covering the film side, as well as another dust cover 43 (FIG. 2) covering the tape side, may be removably located on a cassette, for example secured by screws into end posts (not shown) and molded into the cassette structure. The film can thus be changed easily; reels of various diameters can be used, or the film may be loosely placed (FIG. 5). The tape as well can readily be removed and again replaced. Likewise, covers 141,143 (FIG. 1*a*) can be removable. If it is undesired to permit such removal, the dust covers can be molded on or secured to the underlying structures formed as an integral plastic molding and including the central support 12, as well as all the upstanding walls, by heat seals or plastic cement. A complete, sealed unit is thereby obtained in which unauthorized tampering with the film and the tape is effectively prevented.

The single cassette structure requires only one mold, yet it can be so arranged that it can accommodate film reels, and tape reels, or randomly located film of different lengths. The cut-outs 36 (FIGS. 2,3) and 136 (FIGS. 1*a*, 1*b*) in the central support 12 can be molded once to accommodate film reels 35, or rolls 135, of different sizes. Since, if endless bands of film, or tape are used, no drive is necessary for the winding reels, no further connection through the dust covers to the reels need be provided, the entire motion for transport of tape and film being effected by the film advance mechanism, for example claws engaging the film through the aperture plate in front wall 15, and the capstan 20 (FIG. 1) for the tape. Additional resiliently held braking pads, pressing against the film, or the tape, respectively, and not shown, may be used to provide a slight drag on the tape, or film, respectively, as it is being paid out to prevent tape, or film spillage.

The present invention has been illustrated and described in connection with a tape-film combination cartridge, and more particularly to such a cartridge useful for use with strip film. The invention is not intended to be limited to the details shown, but various changes and modifications may be made within the inventive concept.

We claim:

1. Film and magnetic tape cartridge for association with a film transport mechanism and a tape transport mechanism comprising an endless tape reel to hold an endless loop of magnetic recording tape;

an endless film reel to hold an endless loop of projection film, at least one of said reels having an unobstructed space beneath the rim thereof, the other of said reels being at least partly located in said unobstructed space;

a support housing for said reels, said support being formed with means guiding said reels in nested position and for independent rotation about their respective axes;

and means guiding said film from and to said film reel and said tape from and to said tape reel.

2. Cartridge according to claim 1, wherein the axes of said reels are co-planar.

3. Cartridge according to claim 1, wherein the axes of said reels are inclined with respect to each other, and means are provided holding said reels in position and locating a portion of one of said reels within the unobstructed space of the other.

4. Cartridge according to claim 1 wherein said housing includes circularly located reel guide means engaging the rim of at least one of said reels, whereby the reel is guided for rotation without a center hub.

5. Cartridge for holding an endless band of coiled projection film and an endless band of coiled magnetic tape comprising a support structure;

a reel having a rim holding the tape thereon, said tape reel being rotatably retained on said support structure and leaving an unobstructed sector inside the rim;

a film holding means having a rim holding an endless, closed coil of film thereon, said film holding means rotatably retaining the film coil on said support structure with the axis of rotation of the film coil inclined with respect to the axis of rotation of said tape, and part of the rim entering said unobstructed sector of space inside the rim of the tape reel;

said support structure comprising a plate-like structure of plastic material;

journal means molded in the plastic material guiding said tape reel, said film holding means being molded in the plastic material and guiding said film coil, said plate-like structure forming a common support for said tape reel, said film coil, and said film coil holding means;

and film guiding means guiding film off said coil in the region opposite said sector.

6. Cartridge according to claim 5, wherein said film holding means comprises a film reel retaining the film coil thereon, and said film reel is formed with a stub shaft having a rounded end journalled in said support structure; and said film coil guide means molded in said plastic material guiding the film reel comprises a depression formed in said plate-like structure to receive said stub shaft.

7. Cartridge according to claim 6, wherein said tape reel has a central hub;

and said journal means molded in said plastic material guiding the tape reel comprises a tape reel bearing for said hub extending in one direction to support said tape reel and further being formed with a coaxial journal extending in the opposite direction to support said film reel.

8. Cartridge according to claim 5, wherein said film holding means comprises a film reel retaining the film coil thereon and said film reel is rotatable about an inclined stub shaft, said shaft being secured to said plate-like structure.

9. Cartridge according to claim 5 including a front plate secured to said support structure;

tape guiding means located on one of said plates and at the side thereof rotatably retaining said tape;

said film guiding means guiding film from and to said film coil, and towards the front plate;

and means secured to one of said plates directing light through said film and through said front plate.

10. Cartridge according to claim 9, wherein said film coil guide means comprises a film reel retaining said film coil thereon and the means guiding said film reel comprises a journal molded in said plastic material;

and dust covers are provided covering the film reel and the tape reel, said dust covers being formed of plastic material and having a journal molded therein to form a center bearing for said film reel, said journal being located offset from the journal in the center support plate in the direction of inclination of the axis of said film reel.

* * * * *